Aug. 24, 1926.

W. S. MASON 1,597,452

PISTON RING

Filed Jan. 31, 1924

Inventor
William S. Mason

By Chas. W. Funkhouser

Attorney

Patented Aug. 24, 1926.

1,597,452

UNITED STATES PATENT OFFICE.

WILLIAM S. MASON, OF SAN DIEGO, CALIFORNIA.

PISTON RING.

Application filed January 31, 1924. Serial No. 689,688.

This invention relates to packing rings for pistons and more particularly to metal rings of the transversely divided expansion type.

In the operation of steam or internal combustion engines and the like, where the efficiency of the engine depends upon maintaining a desired fluid pressure in the cylinder, it is necessary that leakage between the piston and cylinder walls be prevented. This is usually accomplished by providing several circumferential grooves in the outer periphery of the piston and placing in these grooves expanded metal rings of various well known types and constructions. Where rings of this character have been employed, much difficulty has been experienced in constructing a joint having parts of sufficient strength to withstand the severe strain incident to the normal operation of the engine.

My present invention has for an object to provide a metal packing ring of the transversely divided expansion type which will effectively prevent fluid leakage.

A further object is to provide a ring which may be readily assembled to the piston and where the juxtaposed ends are provided with an arrangement of projections and recesses whereby an effective fluid seal is maintained under normal working conditions.

A still further object of this invention is to provide a transversely divided metal packing ring which shall be easily manufactured and durable in construction. These and other objects will be more manifest from the detailed description and drawings, in which—

Figure 1:
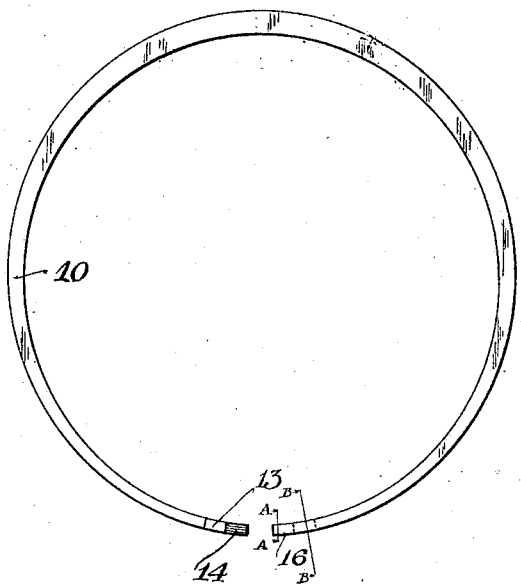
Figure 1 is a plan view of a ring in the expanded position ready for assemblage to an engine piston.
Figure 2:
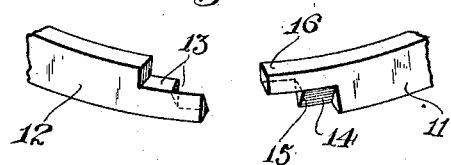
Fig. 2 is a perspective view of the joint embodying my invention.
Figure 3:
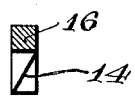
Figs. 3 and 4 are views in section on lines A—A and B—B of Fig. 1.
Figure 4:

Referring to Figure 1 of the drawings, 10 designates a transversely divided metal piston ring embodying my invention and the novel features of the joint are more clearly set forth in Figure 2. The ring 10 is provided with juxtaposed ends 11 and 12 having projections and corresponding recesses adapted to form substantially a lap joint. The top portion of end section 12 is preferably cut away to about half the depth of the ring 10 to form a recess 13, one portion of which presents a horizontal bearing surface and the other a beveled surface. The lower end portion of end section 11 is provided with a projection 14 having a beveled face 15 which extends from the outer periphery at about midway of the depth of the ring 10 to the lower inner periphery of the same. Extending beyond the beveled projection 14 in stepped relation thereto and comprising substantially the extreme upper half of the ring 10 is a projection 16. The cross sections of these projections are shown in Figs. 3 and 4.

By reason of the construction, it will be readily observed that when the end sections 11 and 12 are assembled for position in a piston groove, the beveled projection 14 and its associated rectangular projection 16 will fit into the corresponding recess 13 of the juxtaposed end and form a joint of maximum strength which will effectively prevent fluid leakage.

Having described in detail a particular embodiment of my invention, it is obvious that various changes and modifications may be made in the details and arrangement without departing from the scope of the appended claim.

What I claim is:—

A transversely divided piston ring comprising overlapping end portions, one of said end portions having a rectangular notch adjacent the main body portion and extending substantially half the depth of the ring, a beveled projection extending from said end portion, said beveled projection having a beveled surface extending from the mid portion of the outer surface to the lower inner edge of the ring to provide a beveled notch at said end, the other end portion of said ring having notches formed complemental to said first named notches, whereby the adjacent ring ends may be moved laterally of each other while in position in the piston groove.

In testimony whereof I affix my signature.

WILLIAM S. MASON.